Feb. 26, 1946.  S. W. BRIGGS  2,395,449
FILTER UNIT
Filed March 31, 1942   4 Sheets-Sheet 1
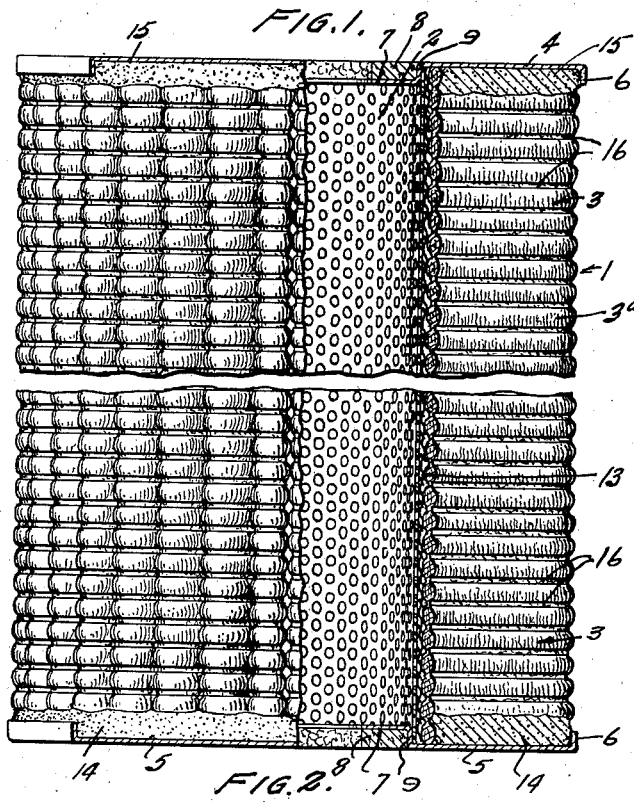
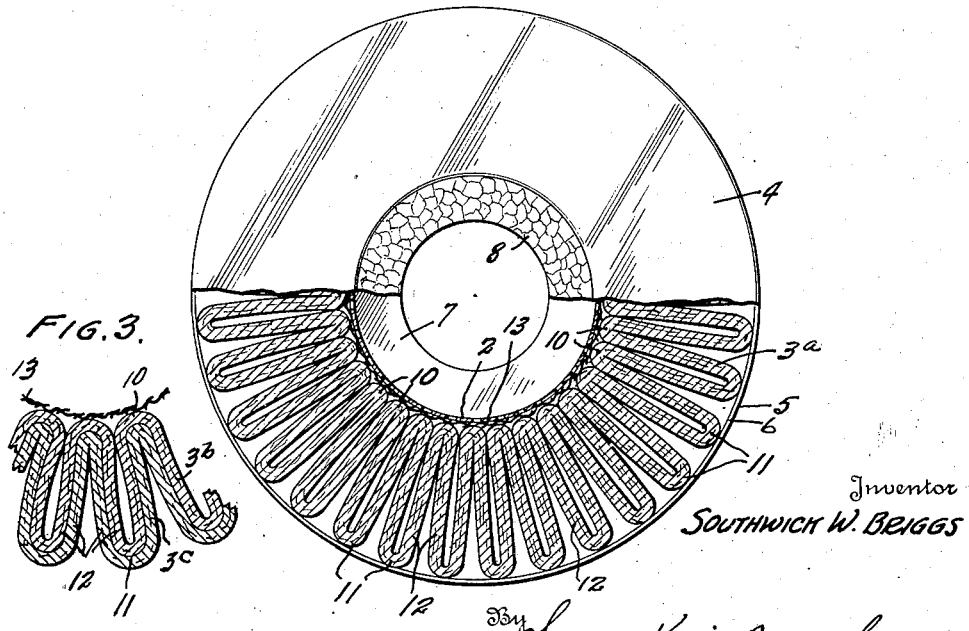
Inventor
SOUTHWICK W. BRIGGS
By Semmes, Keegin, Beale & Semmes
Attorneys Feb. 26, 1946. S. W. BRIGGS 2,395,449
FILTER UNIT
Filed March 31, 1942 4 Sheets-Sheet 2
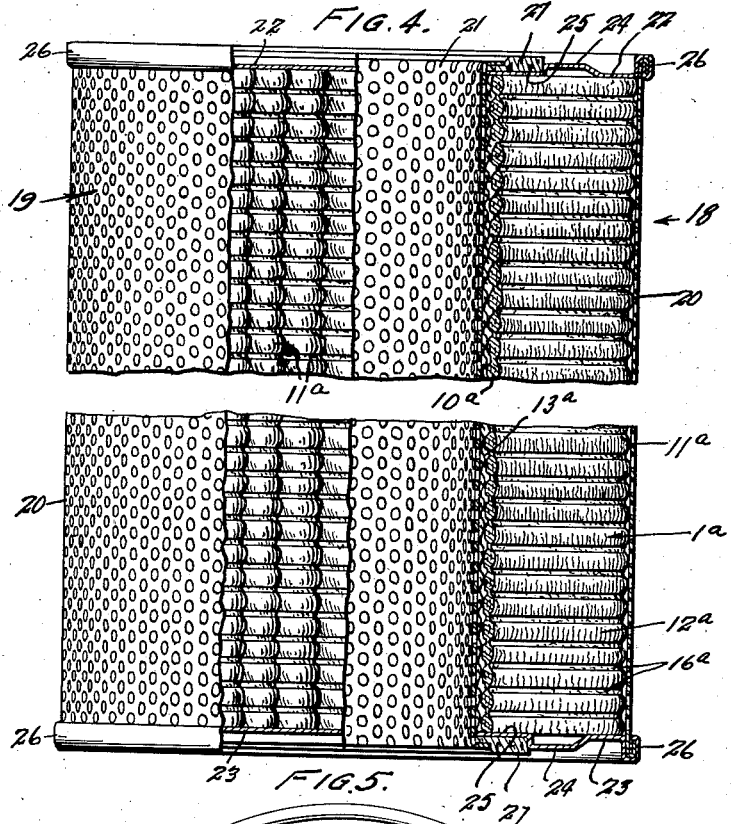
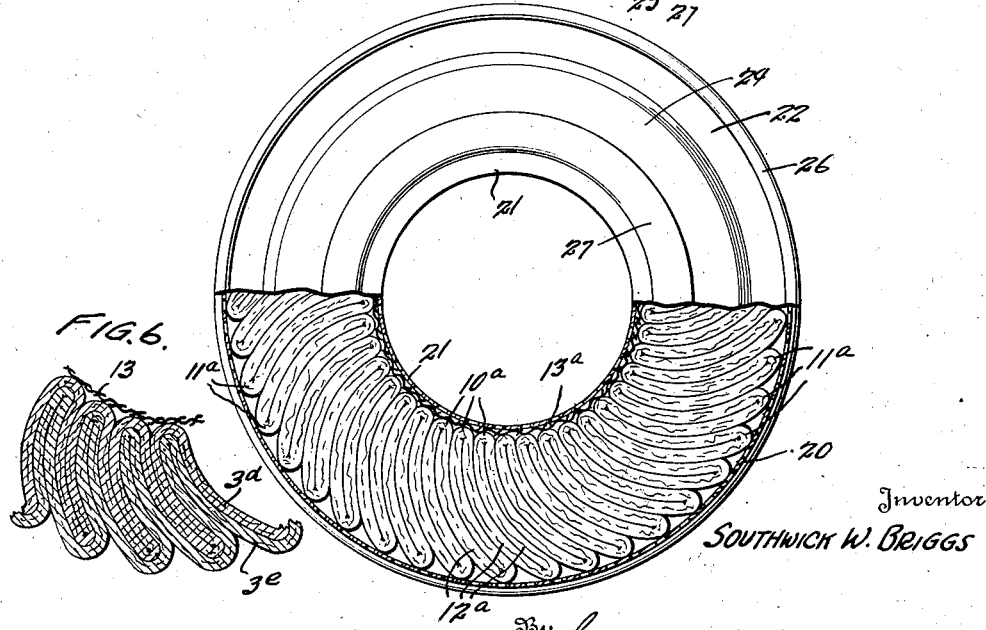
Inventor
SOUTHWICK W. BRIGGS
By Semmes, Keegin, Beale & Semmes
Attorneys

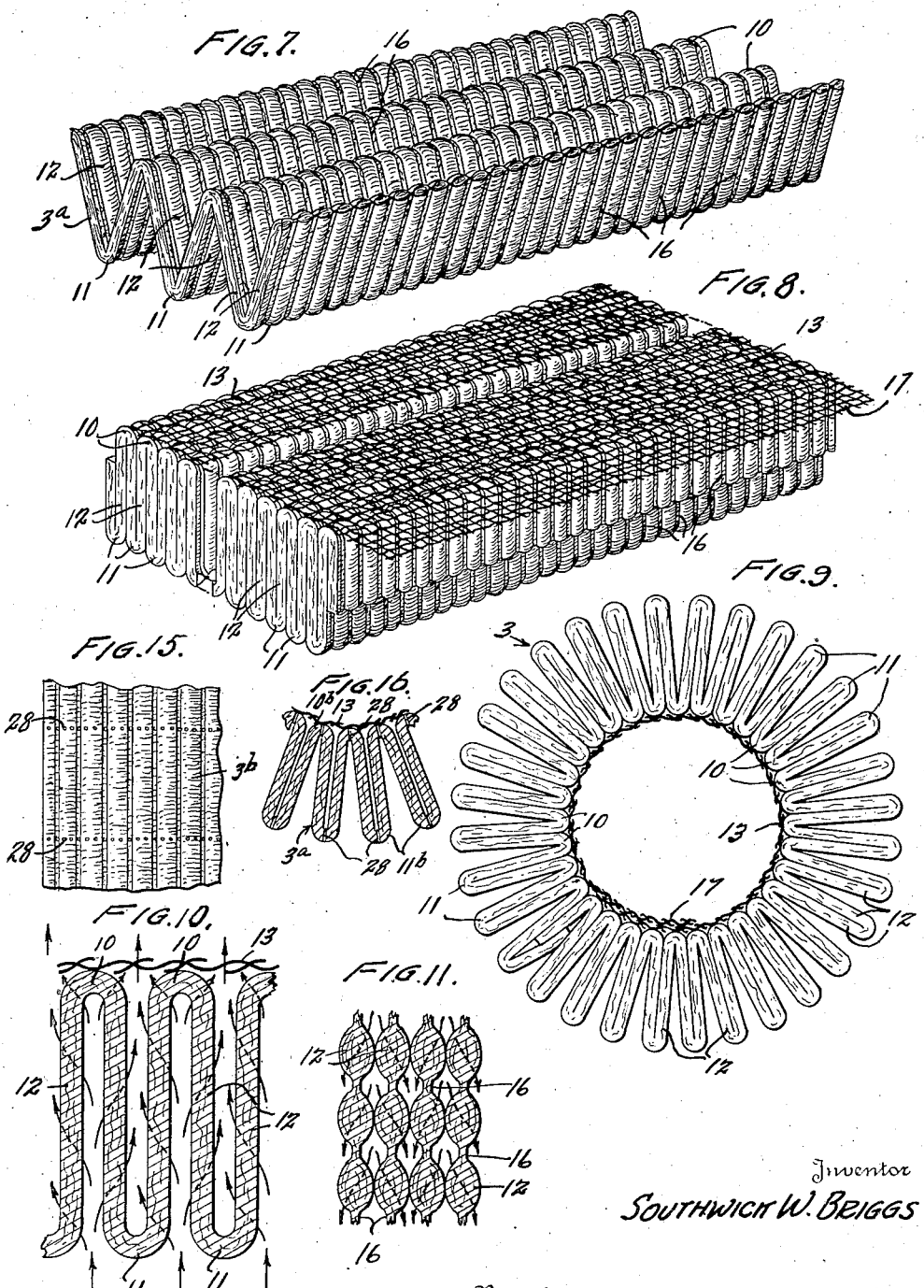

Patented Feb. 26, 1946

2,395,449

UNITED STATES PATENT OFFICE 2,395,449

FILTER UNIT

Southwick W. Briggs, Washington, D. C.

Application March 31, 1942, Serial No. 437,058

14 Claims. (Cl. 210—204)

This invention relates in general to filtration and more particularly has reference to a novel filter unit and to a method of constructing the same.

Various types of filters have been developed for the filtration of oil and other liquids in which filter elements made of cellulosic material are employed. The cellulosic material has been made into various shapes and combined with other materials in an attempt to effect the most efficient filtration. In spite of the many improvements in the filters heretofore produced, it is believed that the maximum degree of efficiency in all types of filtration has not yet been attained. This is partly due to the failure of the cellulosic material because of its nature and because of the manner in which it was incorporated into the filtering device.

The principal object of the present invention is to provide a filter unit which is free from the disadvantages in the prior art constructions as hereinbefore pointed out.

It is also an object of this invention to provide a method of manufacturing filtering elements or cartridges as set forth in the preceding objects.

With the foregoing and other objects in view, the present invention comprises the concept of providing a cellulosic filter composed of a web which is folded back and forth upon itself in zig-zag formation to form a stack composed of a plurality of stretches of the web extending between the adjacent folds therein. After completion of the folding of the web into the zig-zag formation, said formation is compressed to cause the adjacent stretches of the web to lie closely against each other throughout their extent. An adhesive is then applied to the surface of the formation in which one set of the folds lies and a net-like strip of binding material is applied thereto which serves to effectively join together the folds in the surface of said formation. The zig-zag formation is then bent into the form of a cylindrical tubular body with the joined folds lying within the inner peripheral surface thereof and with the unattached folds lying in the outer peripheral surface thereof. A connection is provided between the two outermost ends of the formation so as to maintain the tubular form.

The web prior to folding into the zig-zag formation is provided with embossed grooves extending longitudinally thereof. These grooves serve to form flow passages between contacting stretches of the folded web.

In some instances it may be found desirable to employ a plurality of juxtaposed webs in making the zig-zag formation.

It is also within the concept of the present invention to insert sheets of cellulosic material which have adsorbents such as bauxite incorporated therein between adjacent stretches of the folded web.

The stretches of the web extending from the inner to the outer peripheral portions of the tubular body may lie substantially within radial planes or may be curved.

It may be found desirable in some instances to provide perforations within the folds at the inner and/or outer peripheral surfaces of the tubular body.

The finished tubular body of cellulosic material may be wrapped or inserted within a cage to form a replaceable unit for use in a clarifying device.

In the accompanying drawings in which corresponding reference characters indicate similar parts:

Fig. 1 is an elevational view partly in section of a filter unit constructed in accordance with the present invention.

Fig. 2 is a top plan view of the filter unit also shown partly in section.

Fig. 3 is a fragmentary detailed sectional view of a modified form of the invention.

Fig. 4 is a view similar to Fig. 1 illustrating another modified form of the invention.

Fig. 5 is a top plan view of the structure illustrated in Fig. 4.

Fig. 6 is another fragmentary detailed sectional view illustrating a modification of the present invention.

Fig. 7 is a perspective view of a web of cellulosic material which has been folded into a zig-zag formation according to one step in the procedure of carrying out the present invention.

Fig. 8 is another perspective view illustrating a web of cellulosic material which has been folded into a zig-zag formation, compressed, and to which a net-like backing or binding strip has been joined to maintain the web in its desired formation.

Fig. 9 is a plan view of the filter element after it has been shaped by bending the formation of Fig. 8 into tubular form.

Fig. 10 is a fragmentary detailed transverse sectional view on which is indicated the flow of fluid through the filter unit.

Fig. 11 is a fragmentary detailed longitudinal sectional view on which is indicated the flow of fluid longitudinally through the filter element.

Fig. 15 is a fragmentary elevational view of a web prior to folding and which embodies still another modification of the present invention.

Fig. 16 is a fragmentary detailed transverse sectional view of a tubular filter element embodying the same form of invention included in Fig. 15.

Figure 12:
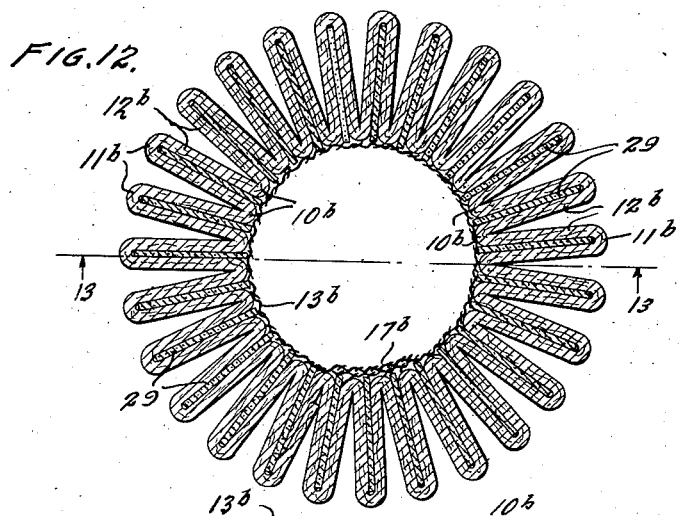
Fig. 12 is a transverse sectional view of a filter element including a further modified form of the present invention.

A filter unit constructed in accordance with the present invention is shown in Fig. 1 of the drawings and is indicated by reference character 1. This unit comprises a foraminous tube 2 which is surrounded by a tubular cellulosic filter element 3. Mounted on the ends of the foraminous tube 2 are closure members 4 and 5 which are in the form of ring-shaped discs. These closure members 4 and 5 are of a diameter slightly larger than that of the filter element and are provided with peripheral axially extending flanges 6. At the inner portion, the closure discs 4 and 5 are drawn to form gasket receiving seats 7 upon which are mounted gaskets of cork or other suitable material 8. In forming the gasket receiving seat 7, an axially extending shoulder 9 is provided in each closure member which is adapted to enter within the end of the foraminous tube 2 and thereby serve to mount the closure members 4 and 5 on the ends of said tube.

The cellulosic filter element 3 is of cylindrical tubular formation. As is clearly illustrated in Fig. 2 of the drawings, the tubular filter element 3 is formed of a web 3a of cellulosic material which is folded back and forth upon itself in zig-zag formation. It will be noted from Fig. 2 that the zig-zag formation of the web of cellulosic filter material is so arranged that one set of alternate folds 10 therein lies in a surface defining the inner periphery of the tubular filter element and that the other set of alternate folds indicated by reference character 11 lies within the cylindrical surface forming the outer periphery of the tubular filter element. In the particular construction shown in Fig. 2, the stretches 12 of the web of cellulosic filter material which lie between the folds 10 and 11 in the inner and outer peripheral portions of the tubular element are arranged to extend substantially radially of the tubular filter element.

The inner folds 10 of the web of filter material are joined together by being attached to the backing or binding strip 13 which lies between the inner folds of the filter element and the foraminous tube 2.

In assembling the filter unit, the tubular filter element 3 is placed about the foraminous tube 2 and is set in fluid plaster of Paris 14 which has been previously deposited in the pocket formed in the lower closure member 5. When the plaster of Paris sets, it forms an end seal, extending across the element, and also serves to secure the filter element to the closure member 5. A similar body of plaster of Paris 15 is provided within the pocket of the closure member 4 to form a seal for the upper end of the filter element 3. While I have referred to the use of closure members 4 and 5, and plaster of Paris 15 and 14, it will be appreciated that other types of end seals may be provided.

The filter element as just described provides an open filter surface which is particularly suitable for filtering fuel oil.

The cellulosic filter material is similar to the wadding described in my co-pending application, Serial No. 237,553, filed Oct. 28, 1939, but differs therefrom in that the embossed grooves 16 extend longitudinally of the web of material instead of transversely thereof as in the above mentioned co-pending application.

The embossed grooves 16 extend parallel to each other and those on one surface of the stretches 12 of the web are aligned with those on the opposite surface thereof so that when the web is folded into zig-zag formation as illustrated, a plurality of flow channels will be provided between the corresponding grooves in contacting surfaces of the stretches of the web similar to those shown in Figs. 10 and 11.

The filter element 3 employed in the unit shown in Fig. 1 and Fig. 2 may be constructed in a manner which is very effective for the purpose. As illustrated in Fig. 7 of the drawings, a web 3a of cellulosic material is folded into zig-zag formation. The alternate folds 10 and 11 are connected by stretches 12 of the webs 3a. The several stretches 12 are of substantially equal length. After a sufficient length of web has been folded, it may be placed on a plane surface and compressed longitudinally thereof to form a compacted zig-zag formation as illustrated in Fig. 8. By exerting a slight pressure on the zig-zag formation, the several stretches 12 of the web will be brought into juxtaposed position and will be evenly distributed between the ends on which the pressure is exerted.

While in the compressed condition, a strip of net-like backing or binding material 13 is applied to the surface defined by the folds 10 and an adhesive such as sodium silicate or other suitable material is applied thereto. After the adhesive has dried, the backing or binding strip 13 will serve to bind the folds 10 together and upon release of the pressure applied to the ends of the zig-zag formation, the unattached folds 11 will tend to fan out. It will be noted that a length of backing or binding strip greater than the length of the compressed zig-zag formation is applied to the latter to provide a tab 17. In constructing the filter element 3, the zig-zag formation having the folds 10 secured together by the binding strip 13 is bent into a tubular formation and the tab 17 is secured to the other end of the binding strip 13 as illustrated in Figure 9 of the drawings. A filter element constructed as described may be assembled into the unit shown in Figs. 1 and 2.

The filter described hereinbefore is particularly suitable for use in the clarification of fuel oil since the filter is of open construction. In other words, a pair of stretches 12 joined by an inner fold 10 flare outwardly and are spaced apart at their outer ends. When it is desired to effect the filtration or clarification of lubricating oils, a somewhat different form of filter unit is often found to be desirable. A filter unit suitable for this purpose is illustrated in Figs. 4 and 5 of the drawings and has been designated by reference character 18. This unit comprises a shell 19 and a cellulosic filter element 1a. The shell is formed of an outer perforated tube 20, an inner perforated tube 21 which is concentric with the outer tube and ring-shaped top and bottom closures 22 and 23. It will be noted that the closure members 22 and 23 are provided with corrugated portions 24 which surround and form annular gasket seats 25. The outer rim flanges 26 of the closures 22 and 23 are sealed to each end of the outer foraminous tube 20 by forming an interlocking seam between the outer peripheral flanges of the closure members and the ends of the tube 20. A seal is effected between the ends of the inner foraminous tube 21 and the closure members by flanging the ends of said inner tube over cork or other suitable gaskets 27 which are positioned in the gasket seats 25.

For this form of the present invention, the cellulosic filter element 1a is of cylindrical tubular formation and is assembled in the shell of the filter unit between the outer and inner foraminous tubular walls. The cellulosic filter element is constructed somewhat similarly to that shown in Figs. 1 and 2 of the drawings, but differs therefrom in that the stretches 12a of the web of cellulosic material are curved intermediate the folds 10a and 11a. Another difference between the filter element 1a and that shown in Figs. 1 and 2 is that in the prior figures, the outer folds 11 in the web of cellulosic material are circumferentially spaced apart and the stretches of the folded web are spaced apart at the outer periphery of the filter element and are in engagement with each other adjacent the inner periphery of said element. In the construction shown in Figs. 4 and 5, however, adjacent stretches 12a of the folded web are in contact with each other throughout substantially their entire extent from the inner to the outer peripheral portions of the tubular filter element. In the form of filter shown in Figs. 4 and 5, the web is provided with embossed grooves 12a in the same manner as is the case of that shown in Figs. 1 and 2. As a matter of fact, the forms of filters shown in Figs. 1 and 4 may be constructed from the same web of cellulosic material. There may be some difference in the length of the stretches between the inner and outer folds of the web forming the tubular bodies, but this will, of course, depend upon the radial thickness of the tubular filter bodies to be constructed.

The principal difference between the filter shown in Fig. 1 and that of Fig. 4 resides in the fact that the filter of Fig. 1 is of open non-compacted construction, whereas the filter of Fig. 4 is compacted or consolidated so that the liquid to be filtered will flow through more restricted flow passages. The method of making the filter shown in Figs. 4 and 5 of the drawings is substantially the same as that employed in making the filter element of Figs. 1 and 2 as illustrated in Figs. 7, 8 and 9 of the drawings. In making the filter element of Figs. 4 and 5, an additional step is applied to the zig-zag formation after it has been assembled as illustrated in Fig. 9. This additional step comprises effecting a relative rotation between the outer and inner peripheral surfaces of the tubular body. Such rotation causes the radially extending stretches of the web to wrap upon each other and thereby consolidate the filter body by reducing the external diameter thereof. After being so wrapped, binding means may be applied over the exterior of the consolidated element or it may be directly inserted without such restraining means into the annular space afforded in the shell between the outer foraminous tube 20 and the inner foraminous tube 21. After assembly within the shell, the open end of the shell may be closed to produce the completed filter unit as illustrated in Figs. 4 and 5.

In the tubular filter elements shown in Figs. 1 and 2 and in Figs. 4 and 5, there are a plurality of flow passages formed between the adjacent stretches of the web of cellulosic material by reason of the alignment of the embossed grooves in the several stretches. This is more clearly illustrated in Fig. 11 of the drawings which diagrammatically represents a cross section through such flow passages. It will be noted from Fig. 10 that a liquid being passed radially inwardly of the tubular filter element through the passage opening at the outer surface of the filter will flow longitudinally of the passages formed by the embossed grooves 16 and will flow through the stretches 12 of the cellulosic material which forms the walls of said grooves into the passages which open on the inner peripheral surface of the tubular filter element. As indicated by the arrows in Figs. 10 and 11, the liquid passing first into the passages which open on the outer surface of the tubular filter element will penetrate into the pores of the cellulosic material and will flow primarily through the loose unembossed portions of the web of filter material between the embossed grooves 16, as is clearly shown in Fig. 11, into the passages which open on the inner peripheral surface of the tubular filter element. While in the form of invention shown in Figs. 1 and 2 the outer portions of the filter element are further spaced apart than the inner portions thereof, the flow of liquid will follow substantially the same pattern as is indicated in Figs. 10 and 11.

As a further modification of the present invention, it is also contemplated to construct the tubular cellulosic filter elements of a plurality of juxtaposed webs of cellulosic material. In Fig. 3 of the drawings, there is fragmentarily illustrated a filter unit such as utilized in the construction shown in Fig. 2 but which differs therefrom in that two webs are simultaneously folded into zig-zag formation and formed into the tubular shape of the filter element. The two webs 3b and 3c may be suitably secured together by an adhesive or other means. Since the cellulosic material of which the webs are formed is somewhat porous, some of the adhesive applied to the folds of the zig-zag formation into which the two webs 3b and 3c are formed for attaching the binding strip thereto will soak through the web 3b to which the adhesive is directly applied, and be at least partly taken up by the web 3c and this will effect a bond between the two webs 3b and 3c.

In Fig. 6, there is illustrated a consolidated type of filter element constructed of two juxtaposed webs 3d and 3e. This element will be constructed in a manner substantially similar to that of Fig. 3 but will include the further steps of consolidation as described in connection with Figs. 4 and 5 of the drawings.

A further modification of the present invention is illustrated in Fig. 12 of the drawings in which it will be noted that a plurality of sheets or strips 29 of cellulosic material having an adsorbent such as bauxite or similar material incorporated therein, are inserted between certain of the adjacent stretches 12b of the folded web of cellulosic material. These leaves or sheets of adsorbent containing material may be similar to those described in my co-pending application, Serial No. 237,554. As described in that application, the adsorbent material is combined with a flexible base or bonding material such as cellulosic fiber. This adsorbent material can be in very fine form distributed evenly through the fiber. In manufacturing the sheets of adsorbent containing material, cellulosic fiber and the selected adsorbent material such as bauxite are beaten together into a pulp in the presence of a liquid. The pulp is dried and compressed into paper-like strips similar to that of pure cellulosic sheets and which form an excellent adsorbent material. The bauxite or other adsorbent used may be under 60-mesh in fineness. It has been found that the adsorbent containing sheets are particularly effective when the bauxite is contained in a proportion over 25% by weight of the finished product. If the material is used in thicker strips, the percentage by weight of bauxite may be increased to as high as 75% of the total weight of the adsorbent mixture. In ordinary small filters, a composition containing approximately 50% by weight of bauxite has been found to be effective.

In assembling a filter element such as illustrated in Figure 12, the procedure outlined in connection with Fig. 7 is followed and after the web of cellulosic material is folded and placed on a plane surface, sheets 29 of the adsorbent containing material are inserted between the upper folds 10b. After this step, a suitable adhesive is applied to the upper folded edges of the cellulosic material and to the exposed intervening edges of the sheets 29 of the adsorbent composition and a strip of binding or backing material is applied thereto as hereinbefore described. From this point on, the procedure for the formation of the tubular filter element is identical as that hereinbefore described.

Figure 14:
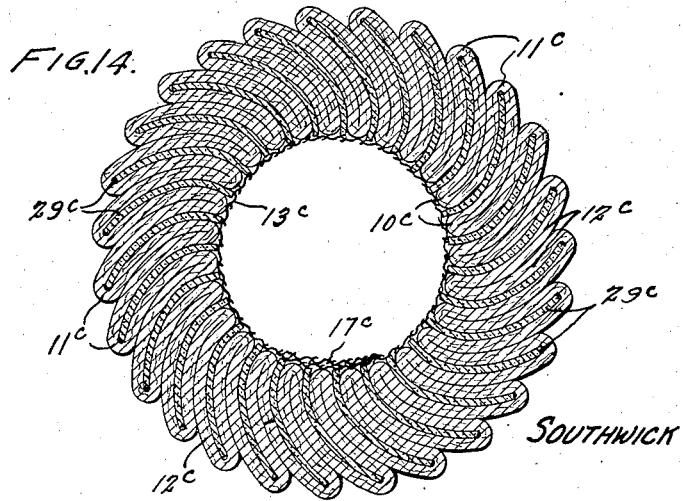
Fig. 14 is a view similar to that shown in Fig. 12 illustrating a further modification of the present invention.

If a tubular filter element of the consolidated form corresponding to that illustrated in Figs. 4 and 5 of the drawings is desired, the outer peripheral portion of the tubular filter element may be rotated relatively to the inner peripheral portion thereof to form a consolidated tubular body as illustrated in Fig. 14 of the drawings. After consolidation, the filter may be positioned in a casing such as illustrated in Figs. 4 and 5.

Figure 13:
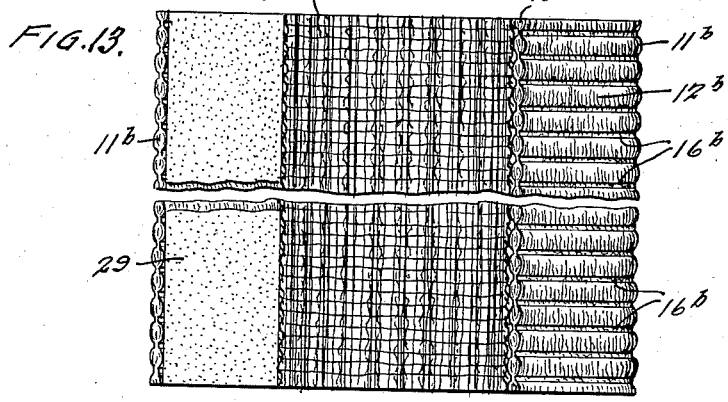
Fig. 13 is a sectional view taken along the line 13—13 of Fig. 12 in the direction of the arrows.

The filter illustrated in Figs. 12–14 of the drawings has been found particularly useful in the clarification of fuel oil and lubricating oil in that the strips or sheets 29a of adsorbent containing material contribute to the filtering action of the substantially pure cellulosic material to effect a more complete filtering action. In this construction, there is the combined unrestricted flow of the liquid through the passages formed by the grooves in the contacting portions of the cellulosic material and likewise in the passages formed by the grooves in the cellulosic material and the contacting adsorbent containing material.

In some instances, it has been found desirable to provide apertures in the inner and outer folded portions of the web of cellulosic material. These apertures 28, as illustrated in Fig. 15, may be formed in the web of cellulosic material prior to folding of the same into zig-zag formation, the web 3b being provided with transverse rows of apertures 28. In constructing a filter element as fragmentarily illustrated in Fig. 16, the web 3b is folded along the lines of perforations 28 so that in the finished form the inner folds 10b and the outer folds 11b will both have the perforations 28 formed therein. The concept of the present invention in which perforations are provided in the folds connecting adjacent stretches of the web of cellulosic material may be applied to either the open type filter element shown in Figs. 1 and 2 or to the compacted type of filter element illustrated in Figs. 4 and 5 of the drawings. By providing the perforations, the folding can be more easily effected and there will be less tendency for the filter to clog up during use because of the partial discharge of liquid through the perforations.

In the several forms of open type of filters described it may, upon first consideration, be assumed that the folded stretches of the web or webs of cellulosic material would collapse upon attempting to force liquid therethrough. Actually, however, there is no collapse of any portion of the web and it maintains substantially its original folded form. This is probably due to the nature of the material of the web and its construction and to the manner in which the web is folded to present a comparatively large surface of the web for a given diameter of the filter element. In any event, due to the ability of the liquid to flow through the filter as illustrated in Figs. 10 and 11 and as described in connection therewith, there is a substantial equalization of pressure on both sides of the web which tends to avoid collapse of the filter and premature clogging thereof.

From the foregoing description, it will be appreciated that the present invention provides a filter element particularly useful in filtering units to be incorporated in clarifiers for various liquids including lubricating oils and fuel oils. The several types of construction herein illustrated and described provide a number of variations of the basic type filter which has been found to be advantageous over filters heretofore employed for the purpose intended. It is particularly noteworthy that the construction of the filter element as described prevents collapse of the loops or folds in the web of cellulosic material and likewise avoids premature clogging of the filter which greatly prolongs its life.

I claim:

1. A cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed and joined together, each stretch of the web between the inner and outer surfaces of the body being curved and in contact with the contiguous stretches of the web.

2. A cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed and joined together, said web having grooves in the surfaces thereof extending radially of the tubular body for forming flow passages between the contacting surfaces of stretches of said web extending between the inner and outer surfaces of the tubular body, each stretch of the web between the inner and outer surfaces of the body being curved and in contact with the contiguous stretches of the web.

3. A cellulosic filter element in the form of a tubular body comprising a plurality of juxtaposed elongated webs of cellulosic filter material folded to extend back and forth between the inner and outer peripheral surfaces of the tubular body with the folds thereof extending longitudinally of the tubular body, the folds of the webs at the inner surface of the tubular body being juxtaposed and joined together, each stretch of said web between the folds in the inner and outer surfaces thereof being curved and in contact with the contiguous stretches of the web.

4. A cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed and joined together, with strips of an adsorbent containing cellulosic material interposed therebetween and extending from the inner periphery of the tubular body to the outer periphery thereof, each stretch of the web between the inner and outer surfaces of the body being curved and in contact with the contiguous stretches of the web.

5. A cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed and joined together, said web having grooves in the surfaces thereof extending radially of the tubular body, and strips of cellulosic material having finely divided bauxite contained therein interposed between said joined portions of the web and extending from the inner periphery of the tubular body to the outer periphery thereof, each stretch of the web between the inner and outer surfaces of the body being curved and in contact with the contiguous stretches of the web.

6. A method of constructing tubular filter bodies comprising folding an elongated web of cellulosic material into a zig-zag formation, compressing said zig-zag formation to cause adjacent stretches of the web to lie in contact with each other, securing the folds at one surface of the zig-zag formation together, bending the zig-zag formation into the form of a cylindrical tubular body with the joined folds forming the inner surface of the tubular body and the other folds lying in the outer surface of said tubular body, and bending the stretches of the web in the same direction to consolidate the tubular body and to bring the stretches into intimate contact with contiguous stretches.

7. A method of constructing tubular filter bodies comprising folding an elongated web of cellulosic material into a zig-zag formation, compressing said zig-zag formation to cause adjacent stretches of the web to lie in contact with each other, securing the folds at one surface of the zig-zag formation together, bending the zig-zag formation into the form of a cylindrical tubular body with the joined folds forming the inner surface of the tubular body and the other folds lying in the outer surface of said tubular body, and rotating the outer surface of the tubular body to wrap the adjacent stretches of the web together and thereby consolidate the tubular body.

8. A method of constructing tubular filter bodies comprising folding an elongated web of cellulosic material into a zig-zag formation, compressing said zig-zag formation to cause adjacent stretches of the web to lie in contact with each other, applying a binding strip to the surface of the zig-zag formation containing one set of folds, applying adhesive to the binding strip and folds to attach the binding strip to the folds, and bending the zig-zag formation into the form of a cylindrical tubular body with the binding strip forming the inner surface thereof and the unattached folds lying in the outer surface of the tubular body.

9. A filter element in the form of a tubular body comprising a web of filter material folded to extend back and forth between the inner and outer peripheral surfaces of the tubular body with the folds of the web at the inner surface of the tubular body being juxtaposed and in contact with each other, and well defined grooves formed in the web at the contacting surfaces of the inner folds, said grooves extending in a generally radial direction with respect to the tubular body to provide passages between the contacting surfaces and thereby permit the free flow of a fluid between such surfaces.

10. A filter element in the form of a tubular body comprising an elongated web of filter material folded to extend back and forth between the inner and outer peripheral surfaces of the tubular body with the folds thereof extending longitudinally of the tubular body and the folds of the web at the inner surface of the tubular body being juxtaposed and in contact with each other, and well defined grooves formed upon the surface of the filter material which is exposed to and in communication with the bore of the tubular body, said grooves extending lengthwise of the elongated web and providing flow passages between the contacting inner folds.

11. A filter element in the form of a tubular body comprising an elongated web of ribbed cellulosic filter material folded to extend back and forth between the inner and outer peripheral surfaces of the tubular body with the folds thereof extending longitudinally of the tubular body and the ribs extending in a generally radial direction with respect to the tubular body, the folds of the webs at the inner surface of the tubular body being juxtaposed and in contact with each other.

12. A filter element in the form of a tubular body comprising an elongated web of ribbed cellulosic wadding folded to extend back and forth between the inner and outer peripheral surfaces of the tubular body, with the folds thereof extending longitudinally of the tubular body and with the inner folds being juxtaposed and in close contact with each other, the stretches of web intermediate the folds lying in planes extending substantially radially of the body, and the ribs extending lengthwise of the web and radially of the tubular body to form passages for a fluid between the inner contacting folds.

13. A fluid filter element comprising a web of fluid-pervious filter material and a sheet of fluid-impervious adsorbent material, ribs formed in one of said materials, the web of filter material being folded to extend back and forth between the inner and outer peripheral surfaces of the tubular body, the sheet of fluid impervious adsorbent material being interposed between stretches of the filter material intermediate said folds, and the said ribs extending generally radially of the tubular body to form channels between the filter material and adsorbent material.

14. A fluid filter element in the form of a tubular body comprising an elongated web of fluid-pervious ribbed cellulosic wadding folded to extend back and forth between the inner and outer peripheral surfaces of the tubular body, with the folds thereof extending longitudinally of the tubular body, strips of cellulosic material having a finely divided adsorbent contained therein interposed between stretches of the web intermediate the folds and extending from the inner to the outer folds of the web, said adsorbent strips being fluid-impervious, and the ribs of the filter material extending in a generally radial direction with respect to the tubular body to provide channels between the filter material and the adsorbent strips.

SOUTHWICK W. BRIGGS.